United States Patent [19]

Cotilla et al.

[11] Patent Number: 5,003,514

[45] Date of Patent: Mar. 26, 1991

[54] DEEP OCEAN RECOVERABLE ACOUSTIC SENSOR VEHICLE

[75] Inventors: Edward J. Cotilla, Cornwells Heights; Joseph M. McCandless, Newtown; Paul Savitz, Philadelphia; Edwin H. Kribbs, Jr., North Wales, all of Pa.

[73] Assignee: The United States of America as represented by the Secretary of the Navy, Washington, D.C.

[21] Appl. No.: 263,894

[22] Filed: Jun. 16, 1972

[51] Int. Cl.$^5$ .............................................. H04G 1/59
[52] U.S. Cl. .............................................. 367/4; 441/2
[58] Field of Search ...................... 340/2, 4 R; 9/8 R; 114/206 R, 206 A, 293, 230; 367/2-6; 441/2, 3

[56] References Cited

U.S. PATENT DOCUMENTS

| | | | |
|---|---|---|---|
| 3,130,703 | 4/1964 | Thompson | 114/294 |
| 3,237,151 | 2/1966 | Thorpe | 367/5 |
| 3,281,765 | 10/1966 | Tapline | 367/4 |
| 3,384,867 | 5/1968 | Bridges | 367/2 |
| 3,628,205 | 12/1971 | Starkey et al. | 367/4 |

Primary Examiner—Thomas H. Tarcza
Assistant Examiner—Daniel T. Pihulic
Attorney, Agent, or Firm—James V. Tura; James B. Bechtel; Susan E. Verona

[57] ABSTRACT

A deep ocean recoverable, tethered acoustic sensor system launchable from an aircraft or ship. Upon water entry, the system separates into an upper flotation module containing a receiver/transmitter, antenna and inflatable bag, and a lower flotation module containing an expandable hydrophone array, transmission cable, flotation chamber, cable disconnect means, radio transmitter and antenna, and a flashing beacon light. The lower flotation module also includes a releasable anchor assembly containing a tethering cable. Recovery of the lower flotation module is accomplished by actuation of the cable disconnect means either by a preset timer means contained within the flotation module or by remote electrical command; upon cable disconnect, the anchor assembly and upper flotation module are discarded, and the lower flotation module floats to the surface for recovery. Upon surfacing a transmitter housed within the lower flotation module begins transmitting a signal beacon through an antenna, and a flashing beacon light actuates to aid in the recovery of the module by helicopter.

13 Claims, No Drawings

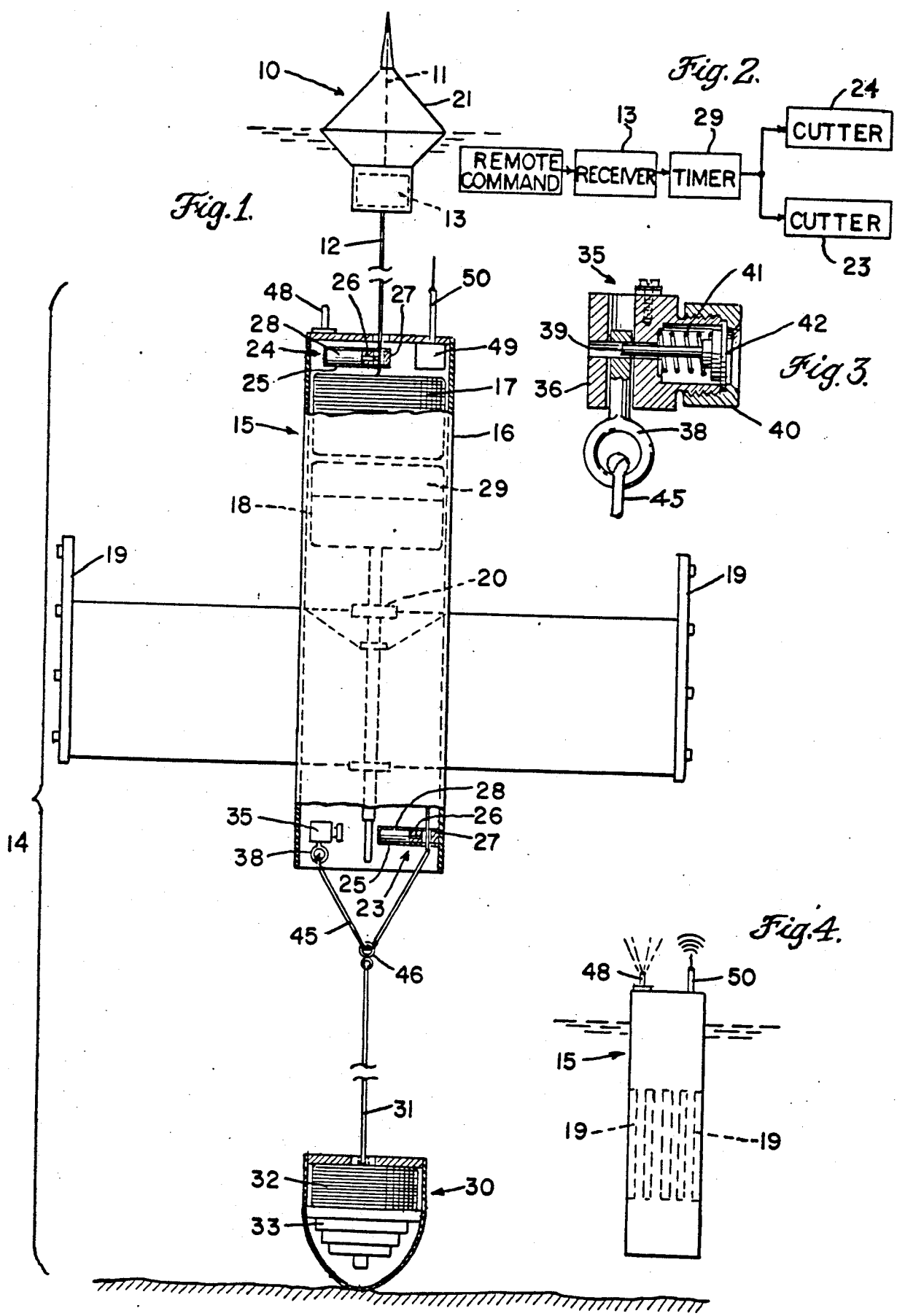

DEEP OCEAN RECOVERABLE ACOUSTIC SENSOR VEHICLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Present ASW (Antisubmarine Warfare) systems employing deep ocean detection devices are extremely sophisticated and expensive. The problems associated with pressures at depths ranging from 5,000 to 18,000 feet below the surface of the water, and inaccuracies of locating the underwater sensors due to drifting and currents are formidable. Many underwater detection systems are now in use such as disclosed in U.S. Pat. No. 3,237,151 to Thorpe, and U.S. Pat. No. 3,281,765 to Taplin. Both of these systems utilize an underwater detection device which is suspended from a floating module on the surface of the water. Each of these systems performs the basic function of detecting large objects under water such as a submarine and transmitting the information to the surface to be monitored by floating vessels or aircraft. One of these disclosures suggests the recovery of the drifting underwater sensing system. In deep ocean detection of submarines a drifting system is not considered optimum as errors in location can be introduced by movement of the sensor location due to surface currents, winds, and tides. A moored or tethered system is deemed superior for this type of application. Examples of moored systems are shown in U.S. Pat. No. 3,384,867 to Bridges and U.S. Pat. No. 3,628,205 to Starkey et al, wherein an underwater detection device is connected by a cable to a heavy weight resting on the ocean floor, but they do not include a flotation unit on the surface of the water for receiving and transmitting signals to an aircraft flying overhead. Due to the complexity and expense of such deepwater detection devices, it is desirable to recover them upon completion of a specific mission. Means must be provided to uncouple the sensing system from its anchor and allow it to float to the surface for recovery by surface vessel or aircraft. Once at the surface, the problem arises in locating the submergible unit. While some moored systems provide a means for severing the anchoring cable, they do not provide for facilitating the location of the sensing system once at the surface.

SUMMARY OF THE INVENTION

Accordingly, it is an object of the present invention to provide an accurate deep ocean acoustic sensor vehicle which can be recovered at the end of a mission. Another object of the invention is to provide a tethered system capable of being released and floating to the surface for recovery. Still another object of the invention is to provide a novel means for severing cables and allowing the system to float to the surface for recovery. A further object of the invention is to provide a means to aid in locating the system once at the surface, such as a radio transmitted signal beacon and a flashing light.

These and other objects of the invention are accomplished according to the present application by a deep ocean, partially retrievable, tethered system for deployment of ASW acoustic sensors, comprising an upper flotation module, and a lower flotation module, comprising a deep acoustic unit (DAU), and an anchor assembly. The upper flotation module, which separates from the lower flotation module upon entry into the water by means of any suitable device, such as a pressure sensitive release mechanism, contains a receiver/transmitter, an antenna, and a flotation bag which inflates upon entering the water. A cable pack contained within the DAU pays out a light signal cable upon descent to bottom impact. The anchor assembly separates from the DAU by means of a pressure sensitive release mechanism and remains on the ocean floor paying out high strength cable contained therein to the buoyant DAU, maintaining the DAU tethered to the anchor assembly at a fixed height during its mission. The operational portion of the DAU comprises an expandable hydrophone array to sense acoustic disturbances, and electronics to transmit the information to the upper flotation module, with its power supply contained within the anchor assembly. At mission end, a novel arrangement of cable disconnect means, located at the top and bottom of the DAU, is actuated either by timer means contained within the DAU or by remote electrical command to disconnect the signal and tethering cables. The buoyant DAU rises to the surface emitting a radio signal by means of a transmitter contained therein to aid in locating the DAU, and a flashing light contained within the DAU actuates to visually facilitate recovery of this expensive component. Approximately 95 percent of the system cost, which is contained in the DAU, is thus recoverable for reuse.

BRIEF DESCRIPTION OF THE DRAWING

FIG. 1 represents a partial cutaway view of the system deployed in the water;

FIG. 2 shows a block diagram of the electronics for actuating the explosive cutters in FIG. 1;

FIG. 3 shows a detailed cross-sectional view of the corrosion link illustrated in FIG. 1; and FIG. 4 depicts the DAU at the water surface emitting a signal beacon with a flashing light in operation.

DESCRIPTION OF THE PREFERRED EMBODIMENT

Referring now to the embodiment of FIG. 1, the deep ocean recoverable acoustic sensor vehicle is shown deployed in the water after having been dropped by an aircraft or a surface vessel. Upon entry into the water, the system separates by means of any suitable device such as a pressure actuated release mechanism into two modules, an upper flotation module 10 and a submergible lower flotation module 14, containing a deep acoustical unit (DAU) 15 and an anchor assembly 30. Flotation module 10 contains within its housing a receiver/transmitter 13, an antenna 11 and a flotation bag 21 which inflates upon entering the water by means of a pressure sensitive device triggering the release of carbon dioxide. Alternatively, flotation bag 21 may be inflated prior to deployment in the water. Flotation unit 10 floats upon the surface of the ocean with antenna 11 extended and supports a light signal cable 12 which pays out from the DAU 15 as it descends to the ocean bottom. The DAU 15 comprises a cylindrical housing 16 approximately 6 feet in length, containing a cable pack 17 located near the top of housing 16 having approximately 22,000 feet of light signal cable 12, a flotation chamber 18 within housing 16 consisting of a plurality of glass spheres encased in syntactic foam, an expandable hydrophone array 19 operatively connected to housing 16 to sense acoustic disturbances, a motor mechanism 20 for expanding and retracting hydrophone array 19, electronics to transmit the information to the flotation unit 10, cable disconnect means 23, 24 and 35 located at the bottom and top of housing 16, and a harness cable 45 operatively attached to an anchor cable 31 through a ring 46. Upon completion of the deployment phase of the operation (i.e., after bottom impact or a timed interval) by pressure sensitive means not illustrated anchor assembly 30 releases from the DAU 15 and rests upon the ocean bottom. The anchor assembly 30 contains a cable 31 in a pack 32 which pays out to the buoyant DAU 15 as it begins to ascend in the water to a fixed height, for example, 500 feet above the ocean bottom. The DAU 15 is now in proper position to begin its mission. Signals picked up by hydrophone array 19 are relayed to flotation unit 10 which transmits the information via reciver/transmitter 13 and antenna 11 to an ASW aircraft. Upon completion of the mission, a signal from a timer circuit 29 contained within flotation chamber 18 of the DAU 15 (or alternatively upon a remote electrical command from the aircraft flying above), triggers lower and upper explosive cutters 23 and 24 operatively attached to housing 16 at the bottom and top respectively in such a manner that cables 45 and 12 pass through the cutting areas. Cutters 23 and 24 may be commercially obtained, and as shown include a cylindrical housing 25 containing a guillotine blade 26 which slides in a groove in housing 25 urged violently forward against an anvil 27 by an explosive squib 28 detonated by an electrical impulse. Blades 26 in cutters 23 and 24 sever harness cable 45 at the lower end of the DAU 15 and signal cable 12 at the upper end of the DAU 15 allowing the DAU 15 to disengage from anchor assembly 30 on the bottom and flotation unit 10 at the surface. Prior to severing cables 45 and 12, hydrophone array 19 is retracted by motor mechanism 20.

Referring now to FIG. 2 a block diagram circuit is shown for actuating explosive cutters 23 and 24. Two methods are available using the components shown. In the preferred embodiment timer circuit 29 is initiated just prior to deployment and is designed to produce a triggering signal to cutters 23 and 24 after a predetermined amount of time (i.e., upon the end of a mission). A second method can be used to override the preset timer triggering, or in the event that the preset timer circuit malfunctions. In the second method a remote command is transmitted from an external source such as an ASW aircraft or surface vessel to receiver 13 in flotation unit 10, which relays an electrical signal to timer circuit 29 producing a triggering pulse to explosive squib 28 in cutters 23 and 24, and causing blades 26 to move forward violently and cut cables 45 and 12.

Referring now to FIG. 1, if cutters 23 and 24 fail to actuate, a cable disconnect means termed a corrosion link 35 attached to the lower portion of the DAU housing is employed to release harness cable 45 from the DAU 15.

Referring now to FIG. 3, corrosion link 35 includes a body 36 slidably receiving a pin 38 which has an exposed end attached to harness cable 45. Pin 38 is retained in body 36 by a plunger 39 slidable therethrough transverse to the longitudinal axis of pin 39. Plunger 39 is urged outwardly by a spring 41 against a disintegrable replaceable disc 42. A retaining ring 40 secures disc 42 in fixed position against plunger 39 on its inner side, and in contiguous exposure to the surrounding medium on its outer side. The composition and size of disc 42 are determined by the method (dissolution, corrosion, galvanic action, etc.) and the time desired for disintegration. Once disc 42 disintegrates sufficiently due to the corrosive action of dissimilar metals of differing electromotive potential in contact, plunger 39 is released outwardly through retaining ring 40 due to the force exerted by spring 41, disengaging pin 38. In the preferred embodiment disc 42 is composed of magnesium with sea water acting as an electrolyte.

The buoyant DAU 15 exerts a tension force on pin 38 through a harness cable 45 of FIG. 1 passing through a ring 49 attached to cable 31. Once pin 38 is released from body 36, harness cable 45 pulls through ring 46 releasing the DAU 15 from anchor cable 31 and allowing it to rise to the surface for recovery. Signal cable 12 is still attached at the top of the DAU 15, but there is sufficient buoyancy in flotation chamber 18 to overcome the additional weight and allow the DAU to rise to the surface.

Upon reaching the surface a pressure sensitive device not shown actuates a battery powered, commercially available flasher light 48 causing it to flash at a predetermined rate, and a transmitter 49 housed in the upper portion of the DAU 15 begins to transmit a radio signal at a standard transmission frequency (26–27 MHz) to guide the recovery aircraft to the location of the DAU 15. When submerged, transmitter 49 is shut off by a seawater connection between an antenna 50 tip and the transmitter housing. At the surface, transmitter 49 activates when antenna 50 breaks the air/water interface. The transmitter 49 and antenna 50 are commercially available.

FIG. 4 depicts the DAU 15 floating at the surface with its hydrophone 19 array retracted emitting a radio signal beacon through antenna 50 and a flashing light 48 for visual identification. This identification aids nearby aircraft in locating and recovering the DAU 15 which represents approximately 95 percent of the total system cost. Flotation unit 10 and anchor assembly 30 including signal cable 12 and anchor cable 31 are discarded and must be resupplied on succeeding missions. The redundancy built into the cable cutting function assures a high probability of recovering the DAU 15.

Thus advantages over drifting or moored, expendable underwater systems are now evident. The ability to recover expensive deep-water vehicles, such as the one disclosed herein, with a high degree of reliability represents a considerable potential saving which has heretofore been unavailable.

It will be understood that many modifications and variations of the present invention are possible in view of the above teachings. It is therefore to be understood that within the scope of the appended claims the invention may be practiced otherwise than as specifically described.

What is claimed is:

1. A moored buoy system, comprising:
upper flotation means;
anchor means;
cable operatively connected between said upper flotation means and said anchor means having an upper section and a lower section; and
lower flotation means operatively connected between said upper and said lower sections of said cable and including disconnect means for selectively disengaging said lower flotation means from said upper and said lower sections of said cable;

whereby said lower flotation means is recoverable at a fluid surface.

2. A moored buoy system according to claim 1, further comprising:

said disconnect means including timing means for disengaging said lower flotation means a predetermined period after a preselected deployment event.

3. A moored buoy system according to claim 2, further comprising:

said disconnect means including linkage means actuated by said timing means.

4. A moored buoy system according to claim 3, further comprising:

said timing means including means for generating an electrical pulse to actuate said linkage means after the predetermined period.

5. A moored buoy system according to claim 4, further comprising:

said timing means having means responsive to a remote command signal for selectively pre-empting the electrical pulse after any amount of elapsed time.

6. A moored buoy system according to claim 5, further comprising:

said timing means including disintegration means for activating said linkage means after a predetermined period of fluid immersion.

7. A moored buoy system according to claim 6, further comprising:

said disconnect means including a harness operatively connected at either end to said linkage means, and intermediate of the ends to said cable.

8. A moored buoy system according to claim 7, further comprising:

said cable having the upper portion connected to said linkage means and the lower portion connected to said harness.

9. A moored buoy system according to claim 8, further comprising:

said linkage means including cutting means receiving the electrical pulse for disengaging the upper portion of said cable and one end of said harness.

10. A moored buoy system according to claim 9, further comprising:

said linkage means including a body formed to slidably receive a pin attached to said harness cable and retained in said body by a plunger slidable therethrough transverse to the longitudinal axis of said pin, said plunger being urged outwardly by a spring against said disintegrable means secured in said body by a retaining ring affixed thereto, said disintegrable means having one side in contiguous exposure to the surrounding fluid medium.

11. A moored buoy system according to claim 7, further comprising:

said lower flotation means including signal beacon generating means operable at the water surface.

12. A moored buoy system according to claim 11, further comprising:

said signal beacon generating means including a radio transmitter.

13. A moored buoy system according to claim 12, further comprising:

said signal beacon generating means further including means for generating visual indicia of its location.

* * * * *